Jan. 13, 1942. A. LINKOGEL 2,269,724
GRASS CULTIVATOR
Filed May 24, 1940
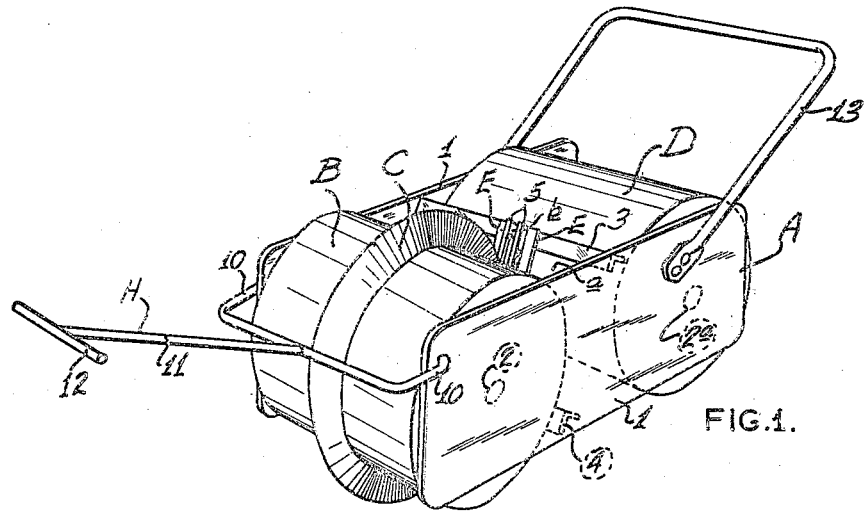
FIG. 1.
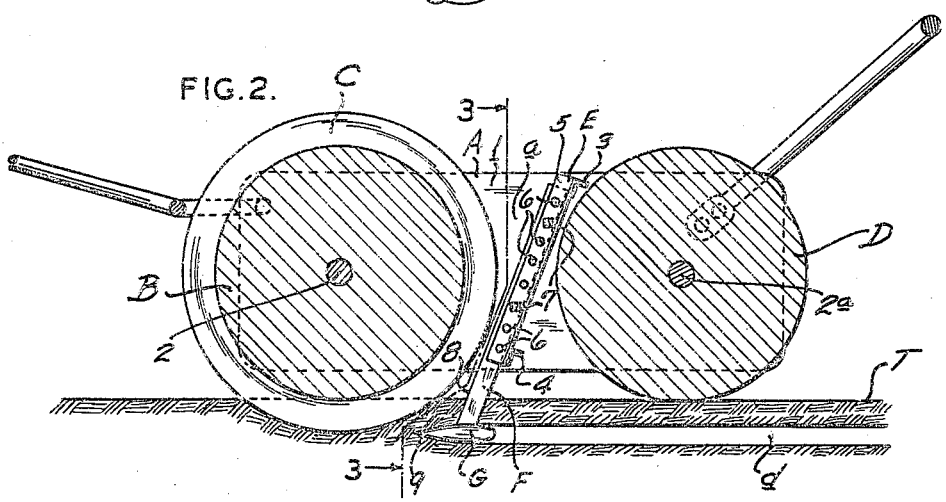
FIG. 2.
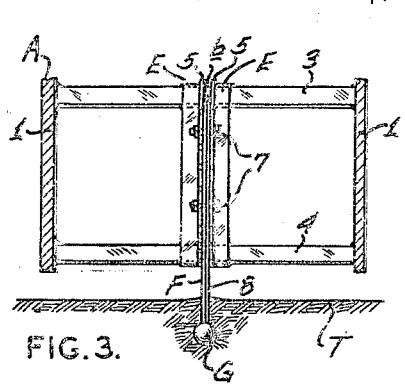
FIG. 3.
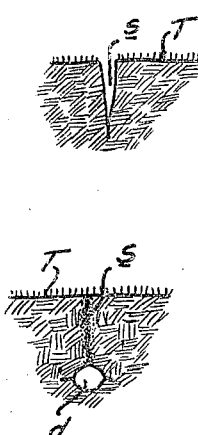
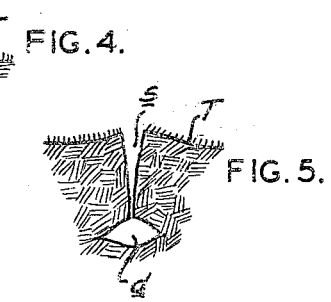
FIG. 4.
FIG. 5.
FIG. 6.
INVENTOR.
ALBERT LINKOGEL
BY
ATTORNEY.

Patented Jan. 13, 1942

2,269,724

UNITED STATES PATENT OFFICE 2,269,724

GRASS CULTIVATOR

Albert Linkogel, Clayton, Mo.

Application May 24, 1940, Serial No. 336,906

2 Claims. (Cl. 97—78)

This invention relates generally to equipment for the cultivation of vegetation and, more particularly, to a certain new and useful improvement in machines adapted especially, though not exclusively, for use on golf greens and the like for effecting grass growth and healthy preservation.

My invention has for its primary objects the provision of a machine uniquely constructed for simultaneously kerfing the sod or turf to a predetermined depth, excavating a sub-surface channel of selected size and depth for aerating the soil and facilitating soil drainage, and smoothing out or leveling the sod or turf to original flatness for eliminating unevenness on the green surface at such kerf that might interfere with a rolling golf ball.

My invention has for a further object the provision of a machine of the type and for the purpose stated which is of simple, rugged structure, which may be cheaply and inexpensively manufactured, which may readily and conveniently be manipulated, and which is highly efficient in the performance of its stated functions.

And with the above and other objects in view, my invention resides in the novel features of form, construction, arrangement, and combination of parts presently described and pointed out in the claims.

In the accompanying drawing—

Figure 1 is a perspective view of a grass cultivating machine of my invention;

Figure 2 is a longitudinal sectional view of the machine;

Figure 3 is a vertical sectional view of the machine taken approximately along the line 3—3, Figure 2; and Figures 4, 5, and 6 are schematic views illustrative of a turf or sod-kerf and formation of a sub-surface drainage channel following a rolling of the machine over a golf green.

Referring now in more detail and by reference characters to the drawing, which illustrates a preferred embodiment of my present invention, the machine includes a body-frame A comprising a pair of vertically disposed rigid preferably metallic side plates 1 transversely connected in spaced parallel relation by laterally aligned front and rear horizontally disposed shafts 2, 2ª, welded or otherwise fixed to and at their ends upon the plates 1.

Mounted for rotation upon the front shaft 2, is a suitable roller B having a diametral size substantially greater than the vertical width of the side plates 1, and welded upon the outer face of, and extending circumferentially around, the roller B midway between its ends, is a colter C constructed of relatively thin steel and provided upon its periphery with a sharp cutting edge, all as best seen in Figure 1 and for purposes presently fully appearing.

Similarly mounted for rotation upon the rear shaft 2ª, is a second cylindrical roller D substantially identical in size and shape with the front roller B and having a smooth uninterrupted periphery for smoothing the sod or turf in the manner of a conventional roller.

As will be noted, the longitudinal distance between the axes of the shafts 2, 2ª, is substantially greater than the diameter of the rollers B, D, thus providing a space, as at a, therebetween, and welded or otherwise fixed at its ends upon, and extending horizontally between the inner faces of, the side plates 1 in the space a, is a preferably angle-iron cross bar 3 positioned a short distance forwardly from the rear roller D and adjacent the upper margin of the side plates 1.

Similarly welded or otherwise fixed upon, and adjacent the lower margin of, the side plates 1 in the space a and positioned adjacent the forward roller B, is a second preferably angle-iron cross-bar 4, the angle cross-bars 3, 4, being tilted about their respective longitudinal axes, so that the downwardly extending flanges thereof lie in substantially the same oblique plane.

Welded or otherwise fixed at their ends centrally upon, and extending longitudinally between, the cross-bars 3, 4, is a pair of angle-iron members E having their upstanding flanges 5 disposed in spaced parallel juxtaposition in the formation of a guide channel, as at b, and provided with a series of spaced registering apertures 6, all as best seen in Figure 2 and for purposes presently more fully appearing.

Adjustably retained in the guide channel b by means of bolts 7 disposed through registering pairs of the apertures 6, is a beam or plow-bar F having a knife-like cutting edge, as at 8, presented forwardly in aligning registration with the colter C.

Supported from the frame A by, and at the lower end of, the beam F, and disposed in a plane below the lowest point of the peripheral plane of the rear roller D, is what may be fairly described as a bullet-shaped share G of substantially circular cross-section annularly tapering in and to a forwardly presented point, as at 9, also disposed in registration with the colter C.

Loosely engaged at its ends, as at 10, with the upper forward corners of the side plates 1, is a U-shaped draw yoke H provided centrally of its bight with a forwardly extending draw-bar 11 equipped at its free end with a suitable cross handle 12, and riveted or otherwise suitably secured at its ends upon the outer faces, and adjacent the upper rear corners, of the side plates 1, is a rearwardly and upwardly extending U-shaped pusher-handle 13, all as best seen in Figures 1 and 2.

In use and operation, the machine is first preferably disposed at a side of the green, which commonly, as is well known, has a certain drainage slope, and is pulled or propelled across the green sod or turf T, as indicated in Figure 2. In such movement or travel, the disk colter C cuts a narrow straight swath s in the turf, as shown in Figure 4. The share G, following immediately behind the cutter C, plows out a somewhat circular channel d and the turf T is tilted upwardly somewhat, as shown in Figure 5. The roller D, coming, in turn, directly behind, presses or rolls the turf T flat again, closing the swath s and leaving the channel d, as shown in Figure 6. The earth adjacent the closed swath s is somewhat loosely consolidated and, in co-operation with the swath s itself, forms a drainage area leading down into the communicating channel d for expediting the normal drainage of the surface of the turf T. In addition, the natural drainage of moisture through the turf T itself also courses into the channel d and will be drained away. Since golf greens almost universally have some slope no matter how slight, the channel d, which follows the line of such slope, will produce very rapid and efficient drainage of the green surface even after the heaviest rainfall.

The presence in a section of turf T of one or more of the drainage channels d improves materially the strength, hardiness, and texture of the grass in the turf T. By reason of the fact that excess moisture is drained rapidly, rotting of the grass roots is eliminated. In addition, inasmuch as the channel or channels d provide a sort of sub-surface reservoir of moisture, the grass roots extend downwardly to the level of the channels in search of moisture and thus a firm deep-rooted grass results.

The machine fulfills in every respect the objects stated, and it should be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. A grass cultivator including a rigid frame, a disk-shaped colter mounted on the frame for rotation, a roller also mounted on the frame for rotation rearwardly of the colter, a pair of vertically spaced transverse members disposed between the colter and the roller, elongated way-forming means mounted on the transverse members, a blade mounted for lengthwise adjustment and lateral support in the way-forming means intermediate the colter and roller and having a cutting edge disposed in the plane of the colter, and a generally cylindrical member having a tapering forward end supported by said blade for the formation of a channel in alignment with the colter and at a selected depth below the lowest point of the circumferential plane of the roller.

2. In a cultivator including a rigid frame having a colter and a roller rotatably mounted in spaced relation within the frame, a pair of vertically spaced transverse members disposed between the colter and roller, elongated way-forming means mounted on the transverse members, a plow-bar adjustably mounted in and laterally supported by the way-forming means, and plow means mounted on the lower extremity of the plow-bar for forming a sub-soil channel.

ALBERT LINKOGEL.